(12) United States Patent
Robertson et al.

(10) Patent No.: US 6,471,764 B1
(45) Date of Patent: Oct. 29, 2002

(54) TREATMENT OF HIGH PERFORMANCE PIGMENTS WITH ETHERAMINE DISPERSING SALTS

(75) Inventors: George H. Robertson, Loveland; Kevin A. Arthur, Butler; Russell J. Schwartz, Cincinnati; Stanislav Vilner, Mason; George McLaren, Maineville, all of OH (US)

(73) Assignee: Sun Chemical Corporation, Fort Lee, NJ (US)

( * ) Notice: Subject to any disclaimer, the term of this patent is extended or adjusted under 35 U.S.C. 154(b) by 9 days.

(21) Appl. No.: 09/714,657

(22) Filed: Nov. 16, 2000

(51) Int. Cl.$^7$ ............................................... C09B 67/18
(52) U.S. Cl. ................ 106/493; 106/410; 106/412; 106/494; 106/495; 106/496; 106/497; 106/498; 106/499; 516/203
(58) Field of Search .................................. 106/493, 494, 106/495, 496, 497, 498, 499, 410, 412; 516/203

(56) References Cited

U.S. PATENT DOCUMENTS

| | | | |
|---|---|---|---|
| 4,057,436 A | 11/1977 | Davies et al. | 106/288 |
| 4,518,435 A | 5/1985 | Sansfield et al. | 106/308 |
| 5,024,698 A | 6/1991 | Schwartz et al. | 106/20 |
| 5,766,268 A * | 6/1998 | Bruhnke | 106/493 |
| 6,284,816 B1 * | 9/2001 | Laksin et al. | 522/143 |
| 6,287,348 B1 * | 9/2001 | Bruhnke | 8/521 |

* cited by examiner

Primary Examiner—Anthony J. Green
(74) Attorney, Agent, or Firm—Sidney Persley

(57) ABSTRACT

An etheramine pigment dispersing salt for enhancing the dispersion performance of an organic pigment composition adding to 100 parts by weight of pigment about 1 to 40 parts by weight of an etheramine pigment dispersing salt.

16 Claims, No Drawings

TREATMENT OF HIGH PERFORMANCE PIGMENTS WITH ETHERAMINE DISPERSING SALTS

FIELD OF THE INVENTION

This invention relates to dispersions of dyestuffs and pigments in organic liquids.

BACKGROUND OF THE INVENTION

There is a need in the area of solvent dispersion of organic pigments for products of lower viscosity (i.e. fluidity) and improved transparency and gloss. This is especially a need in the area of solvent inks for packaging applications. The solvents in these inks are typically oxygenated types and alcohols (ethanol, propanols), esters (ethyl acetate, isopropyl acetate) and ethers (mono methyl ether of propylene glycol), or mixtures of same. The typical resins dissolved in these solvents for formulating packaging inks are nitrocellulose, polyamide, polyurethane and polyvinyl butyrate.

U.S. Pat. Nos. 4,057,436 and 4,518,435 disclose pigment dispersions of greatly increased fluidity produced by the use of certain salts formed by the reaction of amines or quaternary ammonium salts and colored acids. However, these salts are not alkoxylated and are limited to tertiary and quaternary amine type salts.

The new compositions offer ink bases with excellent flow with improved gloss and transparency.

SUMMARY OF THE INVENTION

The present invention relates to etheramine pigment dispersing salts of the formula (I):

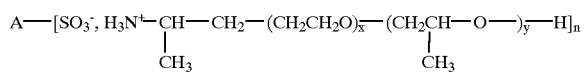

wherein A is the residue of an organic pigment, x and y are each integers from 0 to 100 with $x+y \geq 3$; and n is a number between 1 and 4.

The present invention also relates to an enhanced performance pigment composition containing a 100 parts of an organic pigment and about 1 to 40 parts of etheramine pigment dispersing salts of formula (I).

Other objects and advantages of the present invention will become apparent from the following description and appended claims.

DETAILED DESCRIPTION OF THE INVENTION

It has surprisingly been found that the addition of an etheramine dispersing salt of the formula (I):

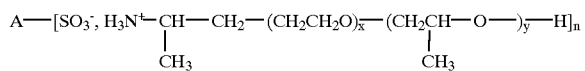

wherein A is the residue of an organic pigment, x and y are each integers from 0 to 100 and $x+y \geq 3$; and n is a number between 1 and 4, to an organic pigment enhances the dispersion of the organic pigment and greatly increases its fluidity. The etheramine salt of the invention can be added to either to a dry or a fluidized pigment. The organic pigment residue and the organic pigment can be of a different origin but preferably are of an identical origin. The organic pigment whose increased dispersion is desired is preferably substantially insoluble in organic liquid. Preferably, the origin of the organic pigment residue and organic pigment are independently selected from the group consisting of phthalocyanine, perylene, quinacridone, and carbazole violet. Both the organic pigment residue and the organic pigments may be mixtures respectively. Most preferably, the residue of an organic pigment and organic pigment are of phthalocyanine origin.

The etheramine dispersing salt of the invention is formed by reacting a sulfonic acid in an organic pigment with an ether amine of the following formula (II):

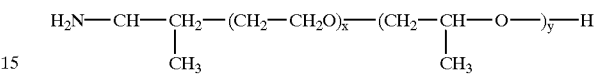

wherein x and y are each integers from 0 to 100 where $x+y \geq 3$; followed by isolating the etheramine salt by filtration. The synthesis of the etheramine salt of the present invention can also take place in the presence of the organic pigment whose increased dispersion is desired.

The present invention also provides for a pigment composition comprising 1 to 40 parts of the etheramine dispersing salt of formula (I) and about 100 parts of an organic pigment. The pigment composition may further comprise about 1 to 15 parts of a quaternary ammonium salt of a sulfonic acid containing pigment derivative, wherein there are from 12–60 carbon atoms in the 4 chains attached to the nitrogen atom of the quaternary ammonium ion. Preferably, the quaternary ammonium salt of the pigment is formed from a pyridinium base of the general formula (III):

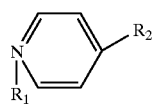

wherein $R_1$ and $R_2$ are each independently selected from $C_{1-22}$ alkyl or alkyenyl groups. Alternatively, the quaternary ammonium salt of the fist pigment is formed from a quaternary ammonium ion of the general formula:

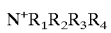

where $R_1$, $R_2$, $R_3$ and R4 are independently selected from $C_{1-22}$ alkyl or alkenyl groups.

The composition of the present invention can be obtained by any of the conventional and well known methods of preparing dispersions. A preferred process for making the product of this invention comprises treating an aqueous slurry of a beta crystal copper phthalocyanine pigment with copper phthalocyanine sulfonic acid at a pH between 2–8 followed by the addition of etheramine or a mixture of etheramine and quaternary ammonium chloride. The product is then removed by filtration and dried.

As a variation of this synthesis, the copper phthalocyanine sulfonic acid may be slurried in water at a pH of 1 to 10 and the etheramine or etheramine and quaternary ammonium chloride added to this slurry.

The copper phthalocyanine pigment may be produced by any of the known arts, such as grinding with salt and glycol or dry grinding, with or without salt, and solvent treating to produce the beta crystal form.

The dispersions containing this etheramine salt may be prepared in the ink system by either adding the previously prepared composition of pigment and pigment salt derivative or by adding the individual components of pigment and derivative in the appropriate ratio.

The following examples further illustrate details of this invention. The invention, which is set forth in the foregoing disclosure, is not to be limited either in sprit or scope by these examples. Those skilled in the art will readily understand that known variations of the conditions of the following procedures can be used. Unless otherwise noted, all temperatures are degrees Celsius and all part and percentages are by weight.

EXAMPLE 1

78 parts by weight of Copper Phthalocyanine (CuPc) Blue pigment and 8 parts by weight of Copper Phthalocyanine sulfonic acid, $CuPc(SO_3)_{n=1.5}$, in press cake forms, are suspended in 1200 parts of water by weight to form a slurry. The pH of the slurry is adjusted to 9.5 to 10.0 by the addition of 3 parts by weight of sodium hydroxide. The slurry is agitated for 1 hr at 85–90° C. 5 parts by weight of polyethylene-polypropylene glycol monomethylether(2-propyl)amine (Jeffamine M2070) and 5 parts by weight polyethylene-polypropylene glycol monomethylether(2-propyl) amine (Jeffamine M2005) are then added and the suspension is stirred for 30 minutes. 4 parts by weight of dicocoalkyl dimethyl ammonium chloride (Arquad 2TH-75) are then added and the slurry is stirred for 1 hr at 80 to 90° C. The pigment slurry is then filtered and the filtercake is washed with hot water (50 to 60° C.) until it has a pH is 7 to 8. The filtercake is then dried in an oven at 70° C.

20 parts by weight of the treated pigment are added to 80 parts of nitrocellulose vehicle together with 100 parts by weight of ⅛" glass beads, shaken for 25 minutes, and diluted further with nitrocellulose vehicle and solvent (ethyl alcohol and ethyl acetate, 2:1). When compared against standard (comparative example 1a, the treated pigment of this example has 110–115% of color strength. This material is also cleaner, greener with improved gloss and transparency.

COMPARATIVE EXAMPLE 1a 83 parts by weight of blue CuPc and 8 parts by weight of $CuPc(SO_3)_{n=1.5}$ in form of presscake are slurried in 1200 parts by weight of water. The pH is adjusted to 9.5 to 10.0 by adding 3 parts of sodium hydroxide. The slurry is then stirred for 1 hr at 85 to 90° C. 9 parts by weight of dicocoalkyl dimethyl ammonium chloride (Arquad 2TH-75) is added and the suspension stirred for 1 hr at 85 to 90° C. 9 parts by weight of dicocoalkyl dimethyl ammonium chloride (Arquad 2C-75) is then added and the suspension stirred at 80 to 90° C. The pigment is filtered, washed, and dried as described in Example 1.

EXAMPLE 2

82 parts by weight of blue CuPc and 8 parts by weight of $CuPc(SO_3)_{n=1.5}$ are slurried as in Example 1. Then, 5 parts by weight of polyethylene-polypropylene glycol monomethylether(2-propyl) amine (Jeffamine M2005) and 5 parts of polyethylene-polypropylene glycol monomethylether(2-propyl)amine (Jeffamine M2070) are added and the suspension is stirred for 1 hr at 80 to 90° C. The pigment is filtered, washed, and dried as described in Example 1.

EXAMPLE 3

79 parts by weight of blue CuPc and 8 parts by weight of $CuPc(SO_3)_{n=1.5}$ are slurried as in Example 1. Then 13 parts by weight of polyethylene-polypropylene glycol monomethylether(2-propyl) amine (Jeffamine M2005) are added and suspension is stirred for 1 hr at 80 to 90° C. The pigment is filtered, washed, and dried as described in Example 1.

EXAMPLE 4

79 parts by weight of blue CuPc are treated as described in Example 3 but 13 parts of polyethylene-polypropylene glycol monomethylether(2-propyl)amine (Jeffamine M2070) are added.

EXAMPLE 5

79 parts by weight of the blue CuPc are treated as described in Example 1 but instead of dicocoalkyl dimethyl ammonium chloride (Arquad 2HT-75), and 3 parts by weight of dioctyl dimethyl ammonium chloride (Bardac LF-80) are used.

EXAMPLE 6

79 parts by weight of the CuPc are treated as described in Example 1 but instead of dicocoalkyl dimethyl ammonium chloride (Arquad 2HT-75), 3 parts by weight of Cetyl pyridinium chloride are used.

EXAMPLE 7

71.6 parts by weight of CuPc and 12 parts of $CuPc(SO_3)_{n=1.5}$ in form of press cake are treated in the same manner as described in Example 1. 7.5 parts of dicocoalkyl dimethyl ammonium chloride (Arquad 2C-75), 7.1. parts by weight of polyethylene-polypropylene glycol monomethylether(2-propyl)amine (Jeffamine M2070), and 1.8 parts by weight of polyethylene-polypropylene glycol monomethylether(2-propyl) amine (Jeffamine M2005) are added. The slurry is stirred for 1 hr at 80–90° C. The pigment is filtered, washed, and dried at 70° C.

EXAMPLE 8

85.9 parts by weight of blue CuPc pigment and 3 parts by weight of $CuPc(SO_3)_{n=1.5}$ in form of press cake are treated as in Example 1. 1.8 parts by weight of polyethylene-polypropylene glycol monomethylether(2-propyl)amine (Jeffamine M2070), 1.8 parts by weight of polyethylene-polypropylene glycol monomethylether(2-propyl) amine (Jeffamine M2005), and 7.5 parts by weight of dicocoalkyl dimethyl ammonium chloride (Arquad 2C-75) are added. The slurry is stirred for 1 hr at 80–90° C. The pigment is filtered, washed, and dried at 70° C.

A summary of the conditions of Examples 1 to 8 is given in Table 1. The results of testing the pigments in a nitrocellulose vehicle and solvent system, similar to that described in Example 1, are given in Table 2.

TABLE 1

| Example | Quartnerary amines | Primary amines (Jeffamine M2070) | Primary amines (Jeffamine M2005) |
|---|---|---|---|
| 1 | Arquad 2C-75 | X | X |
| 1a | Arquad 2C-75 | | |
| 2 | | X | X |
| 3 | | | X |
| 4 | | X | |
| 5 | BardacLF8O | X | X |
| 6 | Cetyl Pyr | X | X |
| 7 | Arquad 2C-75 | X | X |
| 8 | Arquad 2C-75 | X | X |

TABLE 2

| Example No. | Tinting Strength (%) | Gloss 60* (%) | Viscosity (Cps) | Transparency |
|---|---|---|---|---|
| Commercial Untreated | 91.8 | 25.8 | >500 | + |
| 1 | 110.5 | 69.4 | 180 | +++++ |
| 1a | 101.3 | 59.0 | 240 | ++ |
| 2 | 94.2 | 48.1 | 430 | + |
| 3 | 100.2 | 64.0 | 380 | ++ |
| 4 | 84.0 | 48.4 | 400 | + |
| 5 | 108.3 | 65.7 | 160 | + |
| 6 | 109.4 | 69.3 | 150 | +++ |
| 7 | 118.8 | 63.5 | 120 | +++++ |
| 8 | 90.7 | 52.1 | 280 | + |

EXAMPLE 9

Example 1 was repeated using monochlorinated Phthalocyanine blue pigment instead. Versus the untreated pigment, the product of this example has higher gloss and transparency.

EXAMPLE 10

Example 1 was repeated using Pigment Green 7. The pigment had tinting strength of 107.3% versus the untreated standard (100%), and higher gloss and transparency.

EXAMPLE 11

Example 8 was repeated using Pigment Violet 23. The printing ink, had tinting strength of 105% versus the untreated standard (100%) and much higher gloss and transparency.

EXAMPLE 12

Example 8 was repeated using sulfonated Carbazol Violet. The pigment had 107.5% of tinting strength versus the untreated standard (100%) and higher gloss and transparency.

The invention has been described in terms of preferred embodiments thereof, but is more broadly applicable as will be understood by those skilled in the art. The scope of the invention is only limited by the following claims.

What is claimed is:

1. An etheramine pigment dispersing salt of the formula:

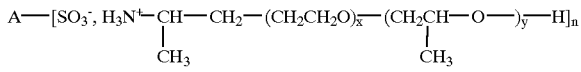

wherein A is the residue of an organic pigment; x and y are each integers from 0 to 100 and $x+y \geq 3$; and n is a number between 1 and 4.

2. A pigment composition comprising 1 to 40 parts of the etheramine pigment dispersing salt of claim 1 and about 100 parts of an organic pigment.

3. The composition of claim 2, wherein the residue of an organic pigment and organic pigment are of the same origin.

4. The composition of claim 2, wherein the residue of an organic pigment and organic pigment are of a different origin.

5. The composition of claim 2, wherein the organic pigment and the residue of an organic pigment are independently selected from the group consisting of phthalocyanine, perylene, quinacridone, and carbazole violet pigments.

6. The composition of claim 2, wherein the residue of an organic pigment and organic pigment originate from phthalocyanine.

7. The pigment composition of claim 2, further comprising about 1 to 15 parts of a quaternary ammonium salt of the residue of an organic pigment, wherein there are from 12–60 carbon atoms in the 4 chains attached to the N-atom of the quaternary ammonium ion.

8. The composition of claim 7, wherein the quaternary ammonium salt of the residue of an organic pigment is formed from a pyridinium base of the general formula:

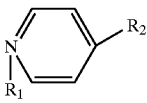

wherein $R_1$ and $R_2$ are each independently selected from alkyl or alkyenyl groups.

9. The composition of claim 7, wherein the quaternary ammonium salt of the residue of an organic pigment is formed from a quaternary ammonium ion of the general formula:

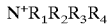

where $R_1$, $R_2$, $R_3$ and $R_4$ are independently selected from alkyl or alkenyl groups.

10. A process for synthesizing of the etheramine pigment dispersing salt of claim 1, comprising:

(a) mixing a sulfonic acid derivative of an organic pigment with an ether amine of the formula:

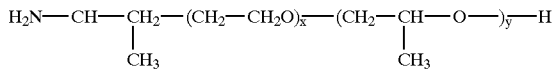

wherein x and y are each integers from 0 to 100 and $x+y \geq 3$; and (b) isolating the etheramine pigment dispersing salt.

11. A process for synthesizing the pigment composition of claim 2, comprising:

(a) mixing, in the presence of the residue of an organic pigment, a sulfonic acid salt of an organic pigment with an ether amine of the following formula:

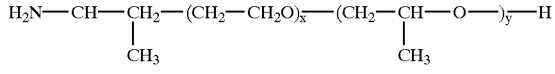

wherein x and y are each integers from 0 to 100 and $x+y \geq 3$;

(b) isolating the pigment composition.

12. A method for enhancing the performance of an organic pigment composition comprising adding to 100 parts of said organic pigment about 1 to 30 parts of an etheramine dispersing salt of the formula:

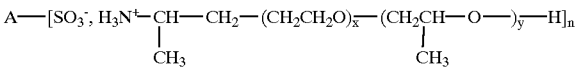

wherein A is the residue of an organic pigment; x and y are each integers from 0 to 50; and n is a number between 1 and 4.

13. The method of claim 12, wherein the residue of an organic pigment and the organic pigment are the same.

14. The method of claim 12, wherein the residue of an organic pigment and the organic pigment are different.

15. The method of claim 12, wherein the residue of an organic pigment and organic pigment are independently selected from the group consisting of phthalocyanine, perylene, quinacridone, and carbazole violet.

16. The method of claim 12, wherein each of the residue of an organic pigment and the organic pigment originate from phthalocyanine.

* * * * *